METHOD FOR PRODUCING A PHOTOCONDUCTIVE ELEMENT

Filed June 5, 1972

United States Patent Office 3,832,298
Patented Aug. 27, 1974

3,832,298

METHOD FOR PRODUCING A PHOTOCONDUCTIVE ELEMENT

Armin K. Weiss, and Robert G. Spahn, Rochester, N.Y., assignors to Eastman Kodak Company, Rochester, N.Y.

Filed June 5, 1972, Ser. No. 259,705
Int. Cl. C23c *15/00;* G03g *5/00*
U.S. Cl. 204—192 10 Claims

ABSTRACT OF THE DISCLOSURE

A photoconductive element can be formed by sputtering doped or undoped orthorhombic and tetragonal lead monoxide layers onto a support from a powdered target within an atmosphere of reduced pressure. The product produced has essentially no fatigue, low dark conductivity, high spatial frequency response and microsecond response when exposed to activating radiation.

Figure 1A:
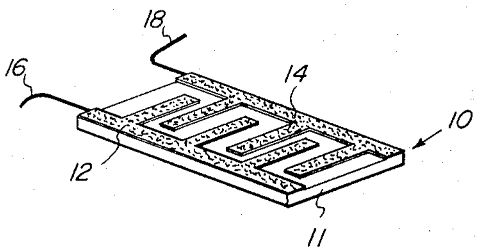

The invention relates to a method for producing photoconductive lead monoxide coatings by sputtering.

Prior art methods teach the deposition of lead oxide by evaporation at reduced pressures to give lead oxide coatings on a support which coatings are usable as photoconductors. In addition, it is known to apply a slurry solution to a substrate which is subsequently heated to fix the solution as a coating thereon. Both of these techniques have a tendency to produce relatively porous or inhomogeneous coatings with incomplete coverage and a sieve-like pattern. With such coatings it is difficult to avoid pinholes, coarse crystals, nonuniform dispersion, poor adhesion to the support and generally reduced photoresponse with a relatively high dark current which severely limits their use under ambient conditions. A further prior art method is that described in U.S. 3,577,272 to R. F. Reithel, wherein lead monoxide powder is disposed in an insulating organic binder material. Coatings of this type function well under ambient conditions, but have only moderate coverage and charge transport due to high binder content and particulate composition. Too, the coatings containing binders are subject to deterioration when in contact with certain solvents or their vapors. Fatigue in such materials is attributed to the strong affinity of the material for oxygen and moisture.

It is also known to make very thin film lead oxide coatings by sputtering from cathodes of solid lead, lead oxide or powdered lead which has been pressed into a unitary form before sputtering, see for example U.S. 3,616,400 and U.S. 2,825,687. These coatings are very thin and have not been used for photoconductive imaging.

One object of the present invention is to provide a novel lead monoxide coating with improved photoconductive characteristics.

Another object of the invention is to provide a new doped or undoped lead monoxide layer with increased response to activating radiation and usable to indicate exposing dose rate and amount of exposure.

A further object of the invention is to provide a doped or undoped lead monoxide coating of high spatial frequency response (resolving powder) useful for electrophotographic imaging applications.

Yet another object of the invention is to provide a doped or undoped lead monoxide coating having essentially no fatigue and with photoresponse in the microsecond range.

Still another object of the instant invention is to provide a new doped or undoped lead monoxide coating having good adhesion, fine crystal deposition and low-dark conductance.

Yet a further object of the invention is to provide a lead monoxide coating having good stability to organic solvents such as alcohol, acetone and toluene.

Another object of the invention is to provide a doped or undoped sputtered lead monoxide layer having a fast response and good sensitivity to x-radiation.

Yet another object of the invention is to provide a sputtered lead monoxide layer having excellent stability of electrical properties over long periods of use under ambient conditions.

In accordance with the invention, lead-monoxide is deposited onto a support by sputtering from a powdered, lead containing source or target onto the support in an inert gas and oxygen atmosphere. The method unexpectedly overcomes adhesion problems by eliminating any need for binders. Furthermore, the practicing of the instant invention results in fine crystal deposition. One of the uses for the product is as a photoconductor, in which application it has decreased response time (to within the microsecond range), high resistance to fatigue and low dark current conductance. In a preferred form of the invention, the coating is heated in air after sputtering to reduce the dark conductivity still further.

Target materials usable comprise lead containing powders, preferably powders of tetragonal or predominantly orthorhombic lead monoxides or mixtures of these lead monoxides. The target material can be impure in varying degrees from sample to sample and is thus "doped" to some extent except when in the purest state. Where additional dopants are desired to, for example, increase the spectral range of sensitivity at some increase in dark conductance, impurities such as lithium, silver, tin, antimony, thallium and bismuth can be introduced as dopants into the target material.

The reaction medium utilized comprises an inert gas-oxygen, preferably an Argon-Oxygen atmosphere, within a pressure range of from about $10^{-4}$ Torr to about $10^{-1}$ Torr, and preferably for about 1 to 60 minutes. The resulting coating thickness ranges from about 1,000 Angstrom units (A.) to approximately 200,000 A. Radio frequency input power is generally kept around 250 watts, but can be within a range of from 50 to 2,500 watts. The sputtering chamber is preferably outgassed prior to sputtering to facilitate the manufacture of photoconductor elements having very similar characteritsics with successive sputterings.

Figure 1B:
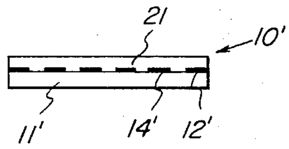
Figure 2A:
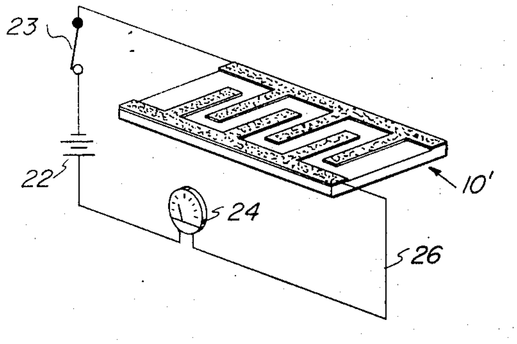
Figure 2B:
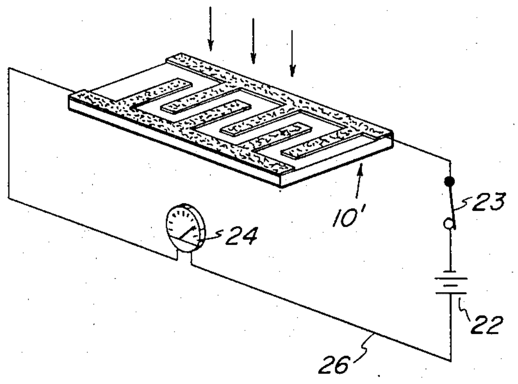

Further objects and advantages will be apparent from the following disclosure with reference to the drawings in which like characters denote like parts and wherein:

FIG. 1*a* shows a perspective view of a photoconductive element in accordance with a preferred embodiment of the invention;

FIG. 1*b* shows a cross section view of the preferred embodiment shown in FIG. 1*a*;

FIG. 2*a* shows the element produced in accordance with the preferred embodiment of the invention in a simple circuit demonstrating the conductive property of the elements; and FIG. 2*b* shows an element in accordance with the preferred embodiment of the invention in the same simple circuit as seen in FIG. 2*a*, but with the radiation impinging upon the element.

Before turning to the FIGS. and in order to better understand the invention, a series of examples are given below to illustrate the method of the invention and the product produced thereby. In performing the examples, reactive radio frequency sputtering was achieved with a commercial sputtering system, model No. AST–300 manufactured by the Bendix Scientific Instrument Division of the Bendix Company which suplies 2,000 volts at 13.56 mHz.

EXAMPLE 1

A lead plate of approximately 0.3 centimeters (cm.) in thickness and about 13 cm. across was placed as target material on a target electrode of a radio frequency sputtering device. A substrate holder, loaded with one standard microscope slide comprising soft glass and one quartz plate approximately 1.3 cm. by 2 cm. having a set of 20 interdigital gold electrodes on one side thereof was suspended approximately 3 cm. above the target electrode and in plane-parallel position to it. The electrode pattern on the quartz plate faced the target cathode.

The chamber was next evacuated to approximately $10^{-6}$ Torr and outgassed with heating lamps for about thirty minutes. Subsequently, Argon and Oxygen gases were admitted to the chamber through controlled leak valves to maintain the Aragon and Oxygen partial pressures at approximately $1\times10^{-3}$ Torr and $3\times10^{-3}$ Torr, respectively.

Sputtering was commenced at this point with approximately 250 watts of RF-input power and approximately 3 amperes (amps) of magnet current. The sputtering was continued for about 10 minutes after which the sample elements were removed from the sputtering system. Both coated substrates, as viewed under fluorescent lights appeared green by reflection and were nearly colorless in transmission. The coating thickness was approximately 2,000 A. for each sample.

Measurement of the current-voltage characteristics of the sample with the 20 interdigital electrodes showed that the coating deposited over and between the electrodes was highly resistive. In the absence of activating radiation, a dark current of about $10^{-12}$ amps was measured with about 400 volts applied across the 20 parallel electrode sets of the sample element. This corresponds to a calculated film resistivity of approximately $3\times10^{17}$ ohms per square. Under exposure to tungsten light, the current increased to $1.2\times10^{-12}$ amps. This relatively small increase under exposure is believed to be due to the small absorption by this thin film of light from a tungsten source. No noticeable fatigue effects were observed upon repeated intermittent exposure of the sample. The films were highly uniform and had excellent adherence to the substrates.

EXAMPLE 2

An aluminum dish approximately 13 cm. in diameter was filled to a depth of approximately 0.1 cm. with powder of predominantly tetragonal lead monoxide, derived from Evans Fumed Litharge, a tradename for lead monoxide of the National Lead Corporation. The lead oxide was prepared by following Example I in U.S. Pat. 3,577,272 to R. F. Reithel. This powder target was placed on the target electrode of the sputtering system. At a distance of approximately 3 cm. and in plane-parallel position to the target was placed a substrate holder containing substrates as in Example 1. The system was outgassed; after which Argon and Oxygen were leaked into the chamber such as to maintain partial pressures of approximately $3\times10^{-3}$ Torr and $1\times10^{-3}$ Torr, respectively. After sputtering as in Example 1, the samples were removed from the system.

Both coated substrates, as viewed under fluorescent lights, appeared yellow-orange in transmission. Their thickness was approximately 10,000 A. X-ray diffraction analysis indicated that these films were predominantly orthorhombic lead monoxide.

Measurement of the current-voltage characteristics of the element with interdigital electrodes showed linearity between current and applied voltage on a doubly logarithmic graph over several orders of magnitude. Furthermore, under exposure to tungsten radiation the current flow was 1,000 times higher than in the absence of activating radiation. When a stroboscope light source (General Radio, Type STROBOTAC 1538–A) was used for exposure, at a 6 inch distance, the photoinduced current of the sample followed the light flashes without fatigue effects. Nominal flash duration was 1 microsecond ($\mu$sec.) at the 50% points of intensity. When placed in an evacuated chamber and exposed to filtered 100 kilo volt peak (kvp.) X-rays at a dose rate of approximately 700 millroentgens per second the current increased 5-fold over its dark value. The changes in exposure conditions were followed by changes in current level virtually simultaneously. Repetitive changes in exposure conditions caused no detectable fatigue effects in the sample.

The films were highly uniform and exhibited excellent adherence to their substrates.

EXAMPLE 3

An aluminum dish approximately 13 cm. in diameter was filled to a depth of about 0.1 cm. with powder of predominantly tetragonal lead monoxide, derived from Evans Fumed Litharge. This powder target was placed on the target electrode of the sputtering system. At a distance of approximately 3 cm. and in planeparallel position to the target was placed a substrate holder with substrates as in Examples 1 and 2. In addition a sheet of aluminum, 0.1 cm. thick, and approximately 4 cm. x 4 cm. was inserted into the holder.

Following outgassing of the system, for approximately 30 minutes Argon and Oxygen were leaked into the chamber such as to maintain partial pressures of approximately $3.9\times10^{-3}$ Torr and $1\times10^{-4}$ Torr, respectively.

After sputtering as in Example 1, the samples were removed from the system and placed in storage for a period of 2 weeks, under ambient room light conditions.

Following the storage period, all samples viewed under fluorescent illumination appeared gray-brown in transmission. Their thickness was approximately 5,000 A. X-ray diffraction analysis indicated that the sample films were predominantly composed or orthorhombic and tetragonal lead monoxide.

Measurement of the current-voltage characteristics of the sample with interdigital electrodes showed the deposited film to be highly resistive in the absence of activating radiation. With a potential of 400 volts applied across the 20 parallel sets of electrodes the dark current was approximately $10^{-10}$ amps. Under exposure to light from a tungsten source the current increased to $10^{-7}$ amps. When a stroboscope light source (General Radio, type STROBOTAC 1538–A) was used for exposure, the photoinduced current of the sample followed the light flashes without fatigue, if as many as 2,500 flashes per second were used. The photocurrent peaks were approximately 10,000 times higher than the dark current. Each light flash had an approximate duration of 1$\mu$ second between the 50% points of intensity.

By comparison, a prior art coating of lead monoxide prepared according to example II, in U.S. Pat. 3,577,272 to R. F. Reithel, comprising a dispersion of lead oxide powder in a binding agent, exhibits very slow temporal response. The photocurrent is a faithful analog of the light flash for flash repetition rates lower than about 0.01 per second. Preparations of this prior art type are said to exhibit electrical fatigue.

The films were highly uniform and exhibited excellent adherence to the substrates.

EXAMPLE 4

An aluminum dish approximately 13 cm. in diameter was filled to a depth of approximately 0.1 cm. with powder of predominantly orthorhombic lead monoxide, derived from Evans Fumed Litharge. The target, sample holder, and substrates were placed in the system as in Examples 1 and 2.

Following outgassing of the system, for approximately 30 minutes, Argon and Oxygen were leaked into the chamber such as to maintain partial pressures of approximately $3\times10^{-3}$ Torr and $1\times10^{-3}$ Torr, respectively.

After sputtering as in Example 1, the samples were removed from the system.

The films, as viewed under fluorescent lights, appeared yellow-orange in transmission and were approximately 10,000 A. thick. X-ray diffraction analysis suggests that these films were predominantly composed of orthorhombic lead monoxide.

Measurement of the current-voltage characteristics of the sample with interdigital electrodes showed the coated film to be highly conductive in the absence of activating radiation.

With a potential of 5 volts applied across the 20 parallel sets of electrodes, the dark current was approximately $2\times10^{-3}$ amps.

Subsequently, this sample was heated in air to approximately 250° C. for approximately 30 minutes and the current monitored during heating. With a potential of 5 volts applied across the electrodes, the current decreased by 4 orders of magnitude while the temperature was increasing, and decreased by an additional 5 orders of magnitude as the sample was returned to room temperature. Subsequent X-ray diffraction analysis of the sample thus treated did not indicate any change in composition.

Following the heat treatment the samples exhibited photoelectric characteristics similar to those observed in Example 2.

The films were highly uniform and well-adhering to the substrates.

EXAMPLE 5

A 13 cm. diameter aluminum dish was filled to a depth of approximately 0.1 cm. with powder of predominantly tetragonal lead monoxide, derived from Evans Fumed Litharge. This dish was used as the target. Another aluminum plate, 13 cm. in diameter, and 0.1 cm. thick, was used as a substrate mounted approximately 3 cm. above and in plane-parallel position to the target.

Following outgassing of the system for approximately 30 minutes, Argon and Oxygen were leaked into the chamber such as to maintain partial pressures of approximately $3\times10^{-3}$ Torr and $1\times10^{-3}$ Torr, respectively.

After sputtering for ten minutes as described in Example 1, the sample was removed. The film thickness was approximately 30,000 A.

A new aluminum substrate of similar geometry to the above was inserted into the chamber, gas pressures and input power adjusted as above and the coating process run for a duration of 30 minutes. This second sample had a thickness of approximately 80,000 A.

A third aluminum substrate of similar geometry to the above was then inserted into the chamber, gas pressures and input power adjusted as above and the coating process run for 60 minutes. This third sample had a thickness of approximately 165,000 A.

All 3 films appeared orange-brown over a center area of approximately 8 cm. in diameter and gray-brown around the peripheral section. The non-uniform appearance is attributed to a corresponding non-uniformity in the plasma during the deposition.

All films exhibited good adherence to the substrates.

EXAMPLE 6

An aluminum dish 13 cm. in diameter was filled to a depth of approximately 0.1 cm. with powder of predominantly tetragonal lead monoxide, derived from Evans Fumed Litharge. This powder target was placed on the target electrode of the sputtering system. At a distance of approximately 3 cm. and in plane-parallel position to the target was placed a substrate holder with substrates as in Examples 1 and 2. In addition, a piece of conductive glass (Nesa glass), 0.3 cm. thick and 3 cm. x 3 cm., was placed on the substrate holder such that the conductive coating faced the target.

Following outgassing of the system for approximately 30 minutes, Argon and Oxygen were leaked into the chamber such as to maintain partial pressures of approximately $3.8\times10^{-3}$ and $2\times10^{-4}$ Torr, respectively.

After sputtering as in Example 1 except for a duration of 20 minutes, the samples were removed from the system.

The films as viewed under fluorescent light appeared gray-brown in transmission and were about 25,000 A. thick.

Measurement of the current-voltage characteristics of the sample with interdigital electrodes showed the deposited film to be highly resistive in the absence of activating radiation. With a potential of 100 volts applied across the 20 parallel sets of electrodes the dark current was approximately $6\times10^{-10}$ amps. Under exposure to light from a tungsten source the current increased by approximately a factor of 100. Under repetitive exposure to a stroboscope light source (GR, STROBOTAC, 1538A), the photoinduced current followed the 1 microsecond light flashes perfectly and without fatigue effects. The photocurrent peaks were approximately 10,000 times higher than the dark current.

All films were highly uniform and had excellent adherence to the substrates.

EXAMPLE 7

An aluminum dish 13 cm. in diameter was filled to a depth of approximately 0.1 cm. with the powder of Example 3. Fresh substrates were used. Substrates and spacings were chosen as in Example 6. Following outgassing of the system for approximately 30 minutes, Argon and Oxygen were leaked into the chamber such as to maintain partial pressures of approximately $3\times10^{-3}$ Torr and $1\times10^{-3}$ Torr, respectively. After sputtering as in Example 1, the samples were removed from the system. The films, as viewed under fluorescent light, appeared dark yellow in transmission and were about 10,000 A. thick. All films were highly uniform and had excellent adherence to the substrates.

Following a storage period of 4 weeks under ambient conditions, measurement of the sample with interdigital electrodes showed the deposited film to be highly resistive in the absence of activating radiation. With a potential of 100 volts applied across the 20 parallel sets of electrodes, the dark current was approximately $2\times10^{-12}$ amps. Under exposure to light from a tungsten source, the current increased by approximately a factor of 100.

Under exposure to light flashes from a stroboscopic light source (General Radio, type STROBOTAC, 1538A) the photoinduced current followed the nominally 1 microsecond long light flashes without distortion and without fatigue. The peak photocurrent was approximately 100,000 times higher than the dark current.

When the sample with interdigital electrodes was placed in an evacuated chamber and irradiated by X-rays (100 kvp., 10 ma., 1 mm. Cu-filter), the current increased from its dark value by a factor of approximately 25 when the incident dose rate was approximately 3 R/second.

As can be seen, the changes in current levels follow the changes in exposure conditions virtually instantaneously and without noticeable fatigue effects for all the samples. This indicates that dose rate detetcion is a capability of the element as well as the usual total dose detection capability.

EXAMPLE 8

Tetragonal lead monoxide powder was prepared by precipitation, following the experimental procedure outlined by W. Kwestroo et al., The Journal of Inorganic Nuclear Chemistry, Volume 27, page 1951, 1965.

To 100 grams of this powder was added 40 cc. of distilled 3A-alcohol and 1 cc. of 0.094 molar silver nitrate solution. The mixture was slurried for 15 minutes and dried for 4 hours in an oven at approximately 110° C.

The dry PbO powder, containing the silver doping, was transferred to an open quartz dish which was placed in a quartz-lined furnace having provisions for gas inlet and outlet. The furnace was flushed with dry nitrogen gas for 15 minutes at room temperature. Under continued nitrogen gas flow the temperature was raised to 200° C., for 1 hour, followed by a further temperature cycle at 400° C. for 3 hours.

The powder was cooled to room temperature under nitrogen gas flow, and placed on an aluminum dish to a depth of approximately 0.1 cm. The sputtering procedure of Example 2 was followed.

The sputtered coatings appeared orange in transmission. Their thickness was approximately 10,000 A. The films were predominantly orthorhombic lead monoxide, as indicated by X-ray diffraction analysis.

Measurement of the current-voltage characteristics was made as in Example 2 over several orders of magnitude. The dark current levels of the Example 8 coatings were about two times as high as those of Example 2. Under exposure to tungsten radiation, the current flow was about 4500 times higher than in the absence of activating radiation.

EXAMPLE 9

Powder preparation was as in Example 8, except the addition was of 20 cc. distilled 3A alcohol and 1 cc. of 0.02 molar solution of antimony trichloride in alcohol. Drying and heating were as in Example 8.

Sputtering was as in Example 8 and sample thickness and composition ware as in Example 8. The appearance of the coated element was yellow-orange in transmission.

Measurement of the current-voltage was taken as in Example 2. The dark current levels were about one-half of those in Example 2. Under exposure to tungsten radiation, the current flow was 3,000 times higher than in the absence of activating radiation.

Referring now to FIG. 1*a* of the drawings, there is shown an element 10 which would be typical of that used as a substrate in accordance with the invention. The element 10 has an insulating support 11 which can be transparent, translucent, or opaque. Although shown as having a square shape, the support can have any desirable shape and thickness. A conductive electrode pattern comprises electrodes 12 and 14 which are connected to leads 16 and 18, respectively. The electrodes 12 and 14 comprise condutcive material deposited by evaporation, sputtering, chemical etching, or by any other method which results in a useful pattern of wires or strips of conductive material. The pattern need not be that shown but can be any desired pattern.

Turning now to FIG. 1*b* there is shown an active element 10′ wherein a radiation-sensitive coating 21 has been deposited over and between electrodes 12′ and 14′ positioned on substrate 11′. The deposited layer 21 forms semiconductor regions between the electrodes 12′ and 14′.

A schemtaic of a simplified circuit utilizing, for example, the element 10′ of FIG. 1*b* is illustrated by FIG. 2*a*. The FIG. 2*a* showing is of an element, 10′ such as that shown in FIG. 1*b*, a power supply 22 indicated in FIG. 2*a* as a battery, a switch 23 shown in the closed position, a current meter 24, and connecting wiring 26. In the absence of activating radiation, the radiation sensitive sputtered lead oxide coating on element 10′ is highly resistive which permits only a low current to flow through the circuit as shown by meter 24.

The circuit shown in FIG. 2*b* is identical to that of FIG. 2*a* except that activating radiation is now incident upon the active element 10′. The coating 21 is now more conductive which permits a higher current to flow between the conductive electrodes 12′ and 14′ and through the circuit as indicated by the reading of current meter 24.

In the case of a transparent or translucent support 11′, visible activating radiation can be directed from either side of the element 10′ to give substantially similar results. X-radiation excitation can likewise take place from sources disposed on either side of the active element 10′. The interdigital electrode sample of the FIGS. is exemplary only. The coatings can be used in many applications other than the simple photocell shown herein. The sputtered lead monoxide coating in accordance with the invention can also be incorporated as a sandwich layer in a laminated device or overcoated with another material to provide the characteristics desired in a particular application.

Although exemplary supports were disclosed, other supports in accordance with the invention, too numerous to mention herein, will be apparent to those skilled in the art. Exemplary criteria for such other supports comprise:

(1) The support should be physically and chemically capable of withstanding the sputtering conditions; e.g., temperatures of from about 400° C. to about 500° C. and very low pressures, i.e., from about $10^{-4}$ to about $10^{-6}$ Torr.

(2) The support should be physically and chemically stable under normal usage with the coating on it. For example, if the support is too easily bent or broken, the coating will crack. If the support physically or chemically deteriorates or decomposes in the presence of lead monoxide, it is unsuitable.

For example, doped and undoped lead-monoxide layers comprising orthorhombic and/or tetragonal lead oxide can be sputtered onto substrates of conductors, semiconductors, and insulators such as quartz, glass, Nesaglass (a trademark of the Pittsburgh Plate Glass Company for tin oxide coated glass), gold coated glass, aluminum, and poly(ethyleneterephthalate) as well as other appropriate materials.

Under normal conditions, the substrates approached 250 to 300° C. during sputtering. A crystallographic change in the target material, noted by a change in color, indicates the surface temperature reached 500° C. in some areas.

Coatings of thickness ≧5,000 A. were analyzed by our X-ray diffraction apparatus. Semi-quantitative results indicate that all deposits are composed of mixtures of lead oxides within the following ranges of distribution:

| | Percent |
|---|---|
| Tetragonal—PbO | 10 to 30 |
| Orthorhombic: | |
| PbO | 50 to 80 |
| $Pb_3O_4$ | Up to 20 |
| $Pb_2O_3$ | Up to 10 |

A relatively high degree of crystallographic ordering was found in most "glassy" samples, *i.e.*, samples with a surface of glass-like smoothness, if deposits were heated to temperatures of about 300° C. during or subsequent to sputtering.

The physical and electrical properties of the sputtered lead monoxide coatings of the invention are not noticeably affected by immersion for one hour in either isopropyl alcohol, acetone or toluene, thus indicating a tolerance to solvents which attack many prior art coatings.

The maximum coating thickness obtainable on any particular substrate is dependent on:

(1) Electrical input power
(2) Target material and
(3) The ratio of oxygen pressure to total pressure, *i.e.*, $P_{02}/P$ total.

Greatest film thickness is achieved with oxygen pressures between about 25% and 50% of the total pressure when the total pressure is about $4\times10^{-3}$ Torr.

Virtually no difference was noted in physical and electrical properties of films prepared from either predominantly tetragonal or predominantly orthorhombic lead monoxide targets.

In general, film thicknesses vary in accordance with several parameters as follows:

(a) increased target-substrate spacing decreases film thickness;
(b) higher target current causes increased thickness; and
(c) increased plasma density results in thicker coatings.

A total pressure (argon plus oxygen) of about $4\times10^{-3}$ Torr and an oxygen pressure of about $10^{-3}$ Torr is preferable for desired coating thickness and uniformity.

Substrate cooling during sputter deposition reduces coating thickness. This is because film growth is controlled by reactions at the substrate surface. Reaction rates, in general, are directly dependent upon the temperature at which the reaction is carried out.

As specifically noted in the examples, the heating cycle of room temperature to about 300° C. for 30 minutes and cooling to room temperature in about 15 minutes, lowered the dark conductivity of all samples so treated. Samples with initially relatively high dark conductivity were effected by orders of magnitude. Samples exhibiting initially lower dark conductivity experienced lesser conductivity reductions.

The invention has been described in detail with particular reference to the preferred embodiments thereof, but it will be understood that variations and modifications can be effected within the spirit and scope of the invention.

We claim:

1. A method of producing a photoconductive element within a sputtering chamber, comprising the steps of:
locating powdered lead monoxide within the chamber;
locating a support within the chamber; and
sputtering lead monoxide onto the support from the powder within an inert gas-oxygen atmosphere to form a photoconductive element having a lead monoxide coating.

2. The invention of claim 1 further comprising heating the lead monoxide coated support in air after sputtering for a time duration within the range of from about 10 to at least about 60 minutes at a temperature within the range of from about 150° C. to about 500° C.

3. A method of producing a photoconductive element within a sputtering chamber comprising the steps of:
locating a source material of powdered lead monoxide within the chamber;
locating a support in the chamber; and
sputtering lead monoxide onto the support from the source material within an inert gas-oxygen atmosphere at a pressure within the range of from about $10^{-4}$ Torr to about $10^{-1}$ Torr for a length of time within the range of from about 1 minute to about 60 minutes by applying radio frequency power within the range of from about 50 watts to about 2,500 watts to form a photoconductive element having a lead monoxide coating having a thickness within a range of from about 1,000 A. to about 200,000 A.

4. The invention of claim 3 further comprising heating the lead monoxide coated support in air after sputtering for a time duration within the range of from about 10 to at least about 60 minutes at a temperature within the range of from about 150° C. to about 500° C.

5. The invention of claim 3 further comprising heating the support to a temperature within the range of about 100° C. to about 450° C. during the sputtering process.

6. The invention of claim 3 wherein the source material comprises orthorhombic lead monoxide in particulate form.

7. The invention of claim 3 wherein the source material comprises tetragonal lead monoxide in particulate form.

8. The invention of claim 3 wherein the source material comprises a mixture of tetragonal and orthorhombic lead monoxide in particulate form.

9. The invention of claim 3 wherein the source material comprises particulate lead monoxide doped with trace quantities of elements selected from the group consisting of lithium, antimony, thallium, bismuth, silver and tin.

10. A method of producing a photoconductive lead monoxide element within a sputtering chamber having a target electrode comprising the steps of:
placing a target material of powdered lead monoxide on the target electrode within the sputtering chamber;
locating a substrate within the sputtering chamber;
outgassing the sputtering chamber;
providing an Argon-Oxygen atmosphere at a pressure within the range of from about $10^{-4}$ Torr to about $10^{-2}$ Torr; and
applying radio-frequency power for between 1 and 60 minutes within the range of from about 100 watts to about 1,000 watts over a target area of up to 200 $cm.^2$ to sputter lead monoxide onto the substrate to form a photoconductive film thereon having a thickness within the range from about 1,000 A. to about 200,000 A.

References Cited

UNITED STATES PATENTS

| | | | |
|---|---|---|---|
| 2,825,687 | 3/1958 | Preston et al. | 204—192 |
| 2,883,305 | 4/1959 | Auwarter | 204—192 |
| 2,917,442 | 12/1959 | Hanlet | 204—192 |
| 3,616,400 | 10/1971 | Wasa | 204—192 |

THOMAS M. TUFARIELLO, Primary Examiner

U.S. Cl. X.R.

96—1.5